United States Patent

[11] 3,593,536

| [72] | Inventors | Regis Lafay<br>Suresnes;<br>Jean C. Macaire, La Celle St. Cloud, both of, France |
|---|---|---|
| [21] | Appl. No. | 743,114 |
| [22] | Filed | July 8, 1968 |
| [45] | Patented | July 20, 1971 |
| [73] | Assignee | Institute Francais du Petrole, des Carburants et Lubrifiant.<br>Rueil-Malmaison, France |
| [32] | Priority | July 11, 1967 |
| [33] | | France |
| [31] | | 113992 |

[54] CRYSTALLIZATION PROCESS AND APPARATUS
19 Claims, 6 Drawing Figs.
[52] U.S. Cl. .................................................. 62/58,
23/273 F
[51] Int. Cl. ...................................................... B01d 3/30,
B01d 9/04
[50] Field of Search ........................................... 23/270.5,
273 F, 310, 270, 269; 62/58

[56] References Cited
UNITED STATES PATENTS

| 2,391,110 | 12/1945 | Walker | 23/270.5 |
|---|---|---|---|
| 2,726,145 | 12/1955 | Thomas et al. | 23/270.5 |
| 3,013,780 | 12/1961 | Wistrich | 23/270.5 |
| 3,314,881 | 4/1967 | Tuwiner | 62/58 |

Primary Examiner—Norman Yudkoff
Assistant Examiner—S. Silverberg
Attorney—Craig, Antonelli, Stewart and Hill ABSTRACT: A process for selectively crystallizing one of the constituents of a liquid mixture of at least two components comprising cooling down the mixture by direct thermal exchange with an immiscible liquid coolant circulating in a countercurrent relationship with respect to said mixture and introduced at a sufficiently low temperature to permit the crystallization of one of said components, wherein said direct thermal exchange is effected by passing the liquid mixture and the immiscible liquid coolant alternately through a plurality of stirring zones and quiet zones, the formation of the crystals of the crystallizable component taking place in the stirring zones and the partial separation of the crystals taking place in the quiet zones.

INVENTORS
REGIS LAFAY
JEAN-CLAUDE MACAIRE
BY Craig & Antonelli
ATTORNEYS

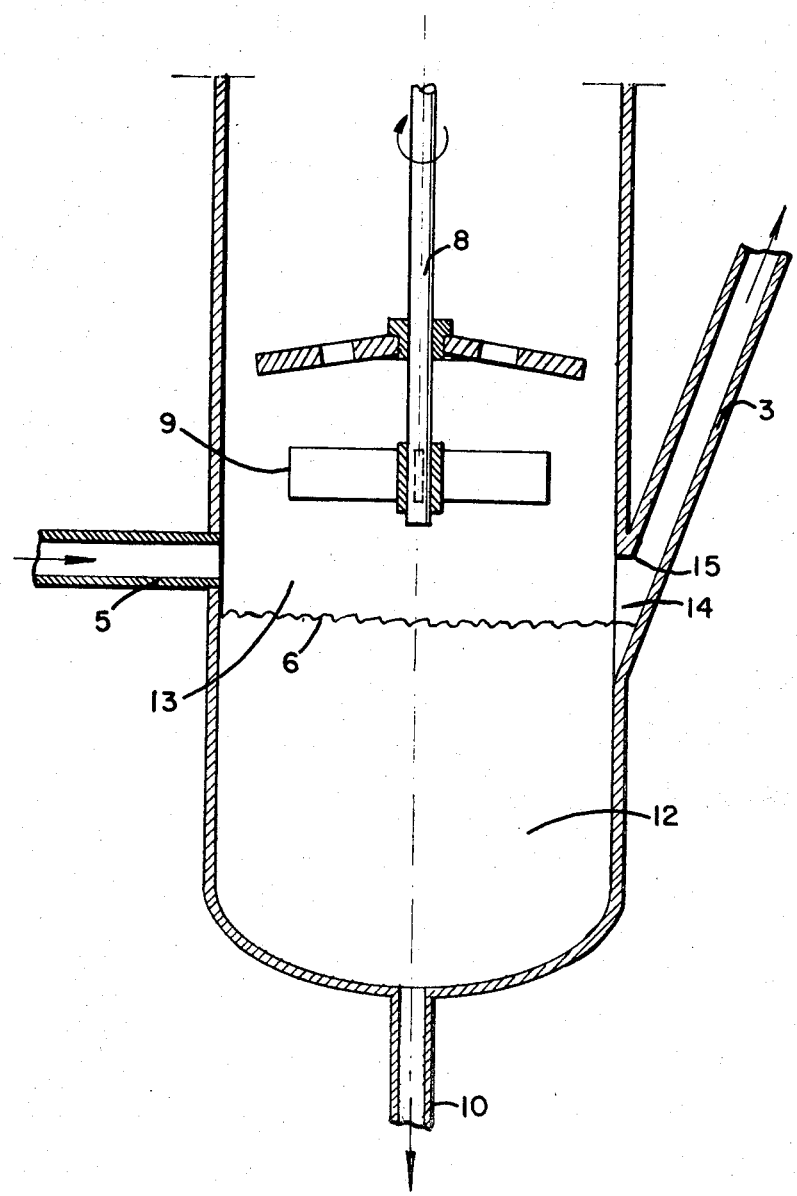
Fig_3

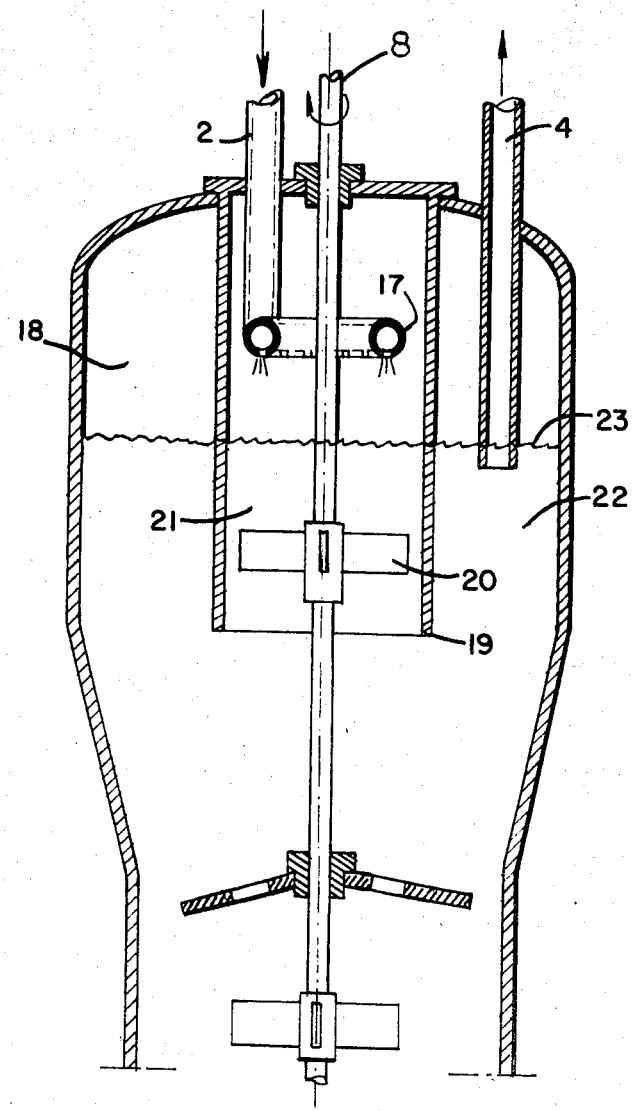
Fig_4

CRYSTALLIZATION PROCESS AND APPARATUS

This invention relates to an improved process for manufacturing and separating crystals from a solution as well as to the apparatus for carrying out this process.

This process comprises cooling a solution of two or more components by means of an immiscible cooling liquid flowing in countercurrent with respect to the solution and in cocurrent with respect to the formed crystals.

The prior known processes resolved the crystallization problem in several ways:

in a first type of process, the solution was cooled down and crystallized by indirect thermal exchange with the cooling liquid; the latter circulated through a coil placed in the solution to be crystallized. In this case the thermodynamic yield, due to losses, was low;

in another type of process, the cooling liquid, usually a liquefied gas, was introduced directly into the solution to be crystallized; the vaporization of this fluid inside of the crystallization vessel brought about the frigorific energy necessary to said crystallization. The solution as well as the partially vaporized cooling liquid and the crystals circulated in the same direction.

In these two cases, the crystallization vessel was a mere enclosure with, possibly, a simple stirrer. The stirring effect resulted mainly from the bubbles of boiling coolant.

If the thermodynamic yield was better than in the first case, such a system exhibited several inconveniences. In addition to the difficulties linked to the use of gases, this system was expensive due to the necessary compression. In most cases, it was necessary to use several auxiliary liquids according to a "cascade" cooling device, where only the last one of these fluids acted for crystallization. On the other hand, the vaporization was a rough phenomenon and it was difficult to obtain an easy control of the crystallization speed.

The process of this invention remedies these inconveniences. It also exhibits particular advantages which will be shown hereafter in the detailed description of the process.

This process comprises directly exchanging heat between the solution to be crystallized and the immiscible cooling liquid, which exchange is obtained by a countercurrent circulation of the two liquids, wherein the two liquids and the crystals are transferred from a stirring and mixing zone in which the three phases are intimately contacted therebetween, thus resulting into a good heat and matter transfer, to a zone of partial separation, which is substantially more quiet and where the cooling liquid and the crystals separate from the second liquid phase, this passage from one zone to another being serially repeated.

It can be easily seen that, as a result of the combination of a countercurrent contact flow with a repeated efficient mixing of the three phases, the thermodynamic yield is outstanding.

Another advantage of this process results from its easy control, easier than with processes making use of vaporization which is a rather uncontrolled phenomenon.

FIGS. 1 to 5 illustrate several embodiments of apparatuses which may be used in this invention:

FIG. 1 is a broad view of this apparatus;

FIG. 2 is a section view of a portion or stage of this apparatus with the corresponding equipment;

FIGS. 3 and 4 show respectively the base and the top of the apparatus;

FIG. 5 is a section view of a part of the apparatus in the particular case referred to hereafter.

Figure 1:
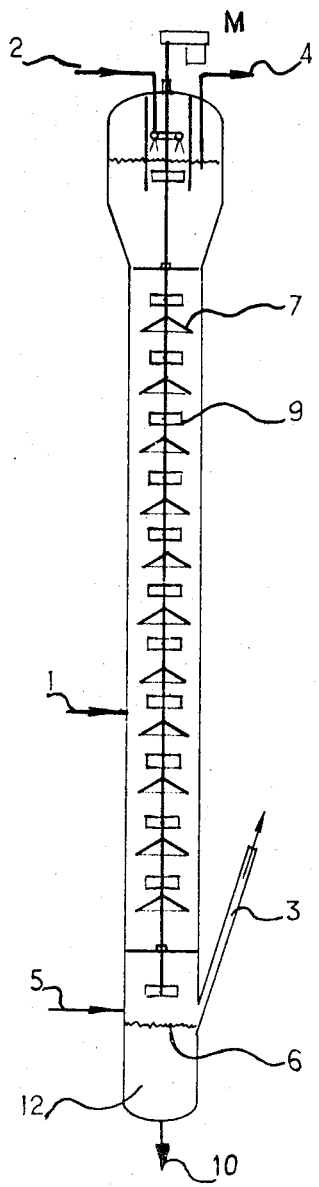

The crystallizer is a substantially vertical, preferably cylindrical column the axis of which makes an angle of 0° to 20° with respect to vertical; the head of this column is preferably of enlarged section; the solution to be crystallized is introduced into the lower half part of the column through pipe 1. The exact place of this pipe is depending on the feed composition and temperature.

From the top there is introduced, through pipe 2, the immiscible cooling liquid. The mother-liquor or impoverished solution is also withdrawn from the top of the column (pipe 4).

There is recovered at the bottom of the column (pipe 3) a suspension of crystals in the mother-liquor and a part of the coolant which may be carried along in the same pipe. The major part of the coolant is withdrawn through pipe 10. The coolant which has been eventually carried along in pipe 3 will be decanted later and the crystals will be separated from the mother-liquor by any appropriate physical means. The latter is recycled to the bottom of the crystallizer through pipe 5 which is usually connected at the level of pipe 3 for withdrawal of crystals.

Of course it is also possible to withdraw the whole of the coolant through pipe 3 together with the crystals. In that case pipe 10 is no more necessary.

Figure 2:
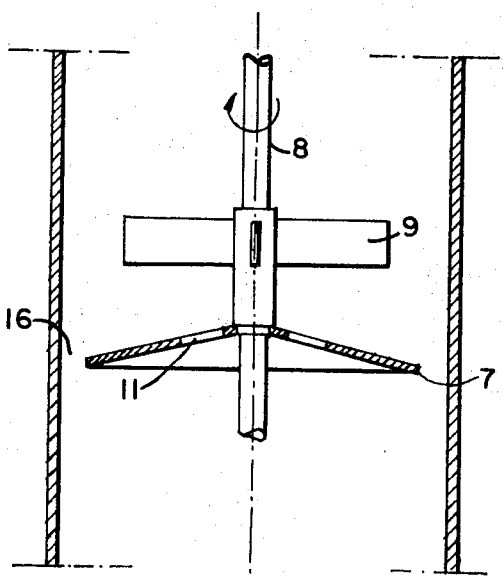
Figure 2A:
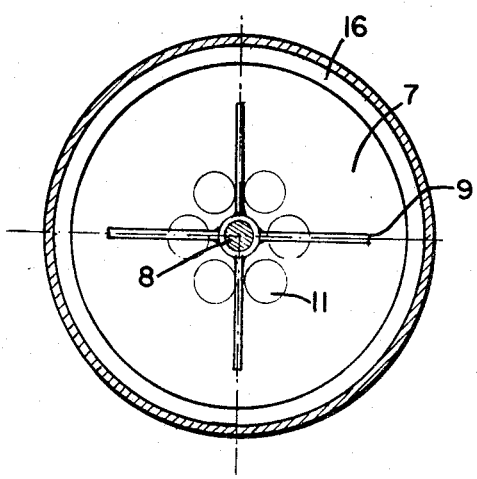
FIG. 2A shows these elements from above.

The column also contains a usually vertical rotation axis bearing alternate plates 7 and stirring blades 9 FIGS. 1, 2 and 2a). These plates are somewhat bent with respect to horizontal, thus forming a cone the top of which is directed towards top in the case of FIGS. 1 and 2.

These plates also comprise passages such as 11 which are placed in the neighborhood of the center of the plates; these passages are indeed essentially placed in the interior of an imaginary circle which has the same center as the plates and a radius which is half the radius of said plates. FIG. 2a shows 4 stirring blades at the same level. Of course this figure may be varied as well as the number of passages in each plate.

The axis is rotated by means of an engine (M on FIG. 1).

The intimate mixing of the two liquids (solution and coolant) takes place in the zone between two plates, near the blades of the stirrer. From this zone, the heavy phase (coolant) and the crystals flow down along the column and meet together with the plates; since the plates are bent, the crystals and heavy phase are rejected towards the exterior and pass to the lower stage through the annular space 16 between the exterior edge of the plates and the column.

The centrifugal energy, although weak, tends to reject the heavy coolant and the crystals towards the enclosure of the column. The rotation speed of the stirrer is usually rather weak, for example 20 to 50 rotations per minute, these values being not limitative; this speed is sufficient to permit a good contact between the two liquid phases, however insufficient to form a stable emulsion which would be detrimental to a further separation, even partial, of the two liquids, thus to a new admixing and finally to the very carrying out the process.

Any accumulation of crystals on the plates and/or obstruction of the annular spaces is impossible sine the plates are not horizontal and are further rotated around the axis 8.

Resulting from a deplacement of volume, the light phase (solution) goes up; it meets the lower face of the plates along which it moves; after it has gone through the central passages 11 in an upward movement, this light phase is anew admixed with a further portion of the heavy phase which will cool it again, thus resulting into formation of new crystals and/or growing of previously formed ones.

The angle between the plates and the horizontal may be weak, for example about 5° to 10°; thus the half angle at the center of the cone will be about 85° or 80°. This half angle may take values between about 45° and about 85°, preferably between 70° and 85°, which makes easier for the light phase to go up and the heavy phases to go down along each face of each plate.

It must be pointed out that in this crystallizer, as well as in liqui-liquid extractors, one of the phases is continuous (here the solution) and the others are dispersed throughout the first one (here the coolant and the crystals).

Thus when it is referred to a separation of phases, for example that of the heavy coolant and the crystals in a given zone of the crystallizer, this refers rather to a relative accumulation of the heavy phases, the coolant however forming no continuous phase in said zone.

This particular shape of the plates has for its object to avoid, due to this partial separation, a crystallization on the still or moving parts of the apparatus; such a troublesome crystallization would result from a possible accumulation of coolant in a given part of the apparatus; also back-mixing is avoided (i.e. ascending movement of the coolant or descending movement of the solution); these two troubles are always detrimental to the efficacy of the process.

As a result of the process of this invention, the two liquids circulate without trouble in countercurrent with respect to one another, and the coolant goes in the same direction as the crystals. This results into temperature and concentration gradients along the crystallizer. Contrary to conventional processes, a quite regular growing of the crystals takes place and the final product which is withdrawn from the bottom of the column is essentially uniform: indeed the small crystals flow down less quickly than the big ones, since they meet many obstacles, and have much more time to develop. It is thus possible to obtain crystals of substantially uniform diameter, for example, in a given case, in the range of 0.6 to 0.8 mm.

It is thus seen that the crystallizer also acts as a classifier for the crystals.

These two advantages are of decisive importance since:
 a regular growing of the crystals results into a low rate of adsorbed or included mother-liquor;
 a big uniformity in the dimensions of the crystals makes the further washing easier, since preferential passages of the washing liquid through the bulk of the crystals may be avoided.

FIGS. 1, 2, and 2a to which particular attention has been given hereabove illustrate an embodiment wherein the lighter solution to be crystallized is introduced into the lower part of the column and the heavier coolant at the top of the column.

As an example of such a case there will be mentioned the crystallization of paraxylene from a $C_8$ aromatic cut comprising the three xylene isomers (ortho, meta, para) and ethylbenzene. As a coolant a salt solution may be used, for example an aqueous solution of calcium chloride optionally containing appropriate additives. The crystals of paraxylene flow down together with the coolant towards bottom. If there is used a system in which the formed crystals are lighter than the mother-liquor, it is perfectly possible to invert the process, i.e. to introduce the solution to be crystallized at the top and the less dense coolant in the lower part.

Figure 5:
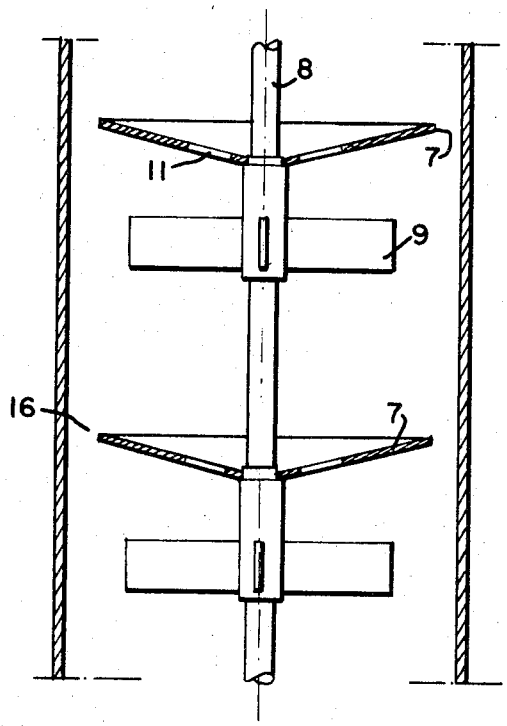

The formed crystals then go up and will be withdrawn as a suspension. In this case the conical plates have their top towards bottom (FIG. 5).

There will be mentioned, by way of example, the purification of water by crystallization by means of a lighter, immiscible coolant. Water flows down through the central holes 11, whereas the coolant and the ice crystals go up through the annular spaces 16.

This crystallization and separation process may thus be applied to quite varied homogeneous mixtures of at least two components. The cooling liquid will be chosen lighter than the solution if the formed crystals are lighter than this solution, or heavier if the crystals are heavier than their mother-solution.

The nature of the constitutive materials of the crystallizer is not essential, provided the apparatus works according to the principles of this invention.

As pointed out above, the process may be applied to the purification of water; in fact it may be broadly used in each case where crystals are to be produced, for example for the purification of materials, the concentration of solutions (fruit juices, milk and so on).

This process and apparatus may be used, for example, to carry out a chemical reaction between two liquids when the latter results into the formation of a precipitate.

Referring to FIG. 1, the withdrawal pipes for the mother-liquor and the crystals suspension may be connected to the two ends of the crystallizer. However this embodiment exhibits two possible inconveniences: the risk of obstruction of the withdrawal pipe by the crystals and the loss of small crystals by carrying along into the withdrawal pipe for the mother-liquor.

These risks may be avoided as follows (see FIGS. 3 and 4 showing respectively the lower and the higher part of the crystallizer and relating by way of example to the crystallization of a solution which is lighter than the coolant). It will be remembered that the crystallizer may be operated inversely with the above-referred modifications.

At the bottom of the column (FIG. 3), the coolant separates out; an interface 6 takes place between the heavy coolant 12 which may be withdrawn through pipe 10, and the suspension of crystals in the mother-liquor 13. The withdrawal duct is directed towards top, not perpendicular with respect to the enclosure of the column and opens at the level of the interface. It is thus possible to avoid the formation of a mass of crystals which would close the withdrawal pipe 14.

As a matter of fact, the crystals are stopped by one fixed surface only, that consisting of the lower part (15) of the V formed by the enclosure of the column and the side-pipe 3, the other surface is movable since it is the interface itself.

This preferred withdrawal device has the advantage of being self-controlled. It works as follows:
 if, for any reason, an accumulation of crystals takes place at the bottom of the column, the interface goes down due to the pressure of the crystals: the passage for the withdrawal of the crystals widens and a larger part of the crystals is withdrawn through pipe 3, which tends to renew the initial equilibrium;
 conversely, if less crystals are formed, the interface tends to go up which closes the mouth 14, thus resulting into a reduction in the rate of crystals and a reestablishment of the initial balance. In order that the mouth 14 may act correctly, it is necessary that it be sufficiently high.

The removal of the crystals and the coolant is made easier by the recycle liquid flow of pipe 5. The feed rate of this recycle liquid is usually rather high, for example 2 to 5 times by weight the amount of crystals which are formed in the column per unit of time. This liquid flow sweeps away the crystals near the interface and carries then into the withdrawal pipe 3.

The major part of the coolant is withdrawn through pipe 10; however this pipe may be omitted without appreciable change in the work of the other parts of the column.

With respect to the higher part of the column, a particularly satisfactory embodiment in the case of use of a heavy coolant is that given in FIG. 4.

The cooling liquid is flowed as droplets from the horizontal pipe 17 which is placed at the level of a gaseous atmosphere 18 consisting essentially of air with vapors of the solution; there is thus avoided the formation of crystals directly on the inlet pipe for the coolant, said pipe being necessarily colder, and also the corking of the pulverisation holes.

The regulation of the higher level of the liquid which is necessary for maintaining this gaseous atmosphere may be carried out by any known process of level detection and regulation, by means of pumps, for example, or preferably by acting on the pressure of this gaseous volume, for example by adding or withdrawing air.

The cylinder 19, which is open at its lower part and which encloses the pipe 17 and the last blades 20, separates a stirred zone of liquid 21 from a more quiet zone 22 where opens the withdrawal pipe for the impoverished solution 4. The latter goes through the interface liquid gas 23.

The first crystals (others may be formed also all along the column) are formed in the central agitation zone; conversely, in the peripheric zone, a decantation of the crystals takes place. It is thus particularly interesting to pump the impoverished solution from the latter zone. Thus the widening of the top of the column increases the volume of the quiet zone 22 and makes easier the withdrawal of the impoverished solution.

It is obvious that the above-mentioned devices for the top and the bottom of the column are preferred embodiments and that many changes may be brought about.

There will be given hereafter the experimental data relating to a mixture which has been subjected to purification in a crystallizer according to this invention. This example is not limitative in any aspect.

A crystallizer such as described on FIG. 1 is fed with a solution containing by weight: 20 percent of paraxylene, 4.5 percent of orthoxylene, 58 percent of metaxylene and 17.5 percent of ethylbenzene.

This solution is at −10° C. From the top, through pipe 2, there is admitted brine at −70° C. The mother-liquor issues through pipe 4 at −65° C with the following composition by weight: 10 percent of paraxylene, 5 percent of orthoxylene, 65 percent of metaxylene and 20 percent of ethylbenzene.

The suspension of crystals which is withdrawn from the bottom of the column through pipe 3 is at −15° C. The crystals separated from the liquids have the following composition by weight: 93 percent of paraxylene, 0.4 percent of orthoxylene, 5 percent of metaxylene and 1.6 percent of ethylbenzene.

We claim:

1. A process for selectively crystallizing one of the constituents of a liquid mixture of at least two components, comprising cooling down the mixture by direct thermal exchange with an immiscible liquid coolant circulating in countercurrent relationship with respect to said mixture and introduced at a sufficiently low temperature to permit the crystallization of one of said components, the immiscible coolant being selected so as to be lighter than the mixture if the formed crystals are themselves lighter, or heavier if the formed crystals are heavier than the mixture from which they are obtained, said process further comprising conducting said crystallization in a substantially vertical elongated zone having two ends and a plurality of alternately disposed stirring zones and quiet zones, the liquid mixture and the liquid coolant being stirred together to form crystals of the crystallizable component in the stirring zones, and then in the relatively more quiet space of the quiet zone, more remote from the stirring zone, the crystals are partly separated, the crystals and the coolant being carried away towards a prior stirring zone, the mixture of each of said stirring zones being displaced towards a further stirring zone through at least one passage between the said stirring zones, and said mixture being stirred again with a new portion of coolant which is relatively cooler than that of the previous stirring zone so as to form new crystals, the passage from a prior zone to a further zone being sequentially repeated, and recovering at one end of the said crystallization enclosure a suspension of crystals in the liquid coolant and at the other end the liquid mixture of at least two components which is impoverished of the crystallizable constituent.

2. A process according to claim 1, wherein paraxylene is crystallized from a mixture of xylenes.

3. The process of claim 2, wherein the immiscible liquid coolant is an aqueous solution of calcium chloride.

4. The process of claim 3, wherein the liquid mixture of xylenes is introduced at a temperature of about −10°C C. and the calcium chloride is introduced at a temperature of about −10°C. and the calcium chloride is introduced at a temperature of about −70°C.

5. A process for selectively crystallizing one of the constituents of a liquid mixture of at least two components, comprising cooling down the mixture by direct thermal exchange with an immiscible liquid coolant circulating in countercurrent relationship with respect to said mixture and introduced at a sufficiently low temperature to permit the crystallization of one of said components, the immiscible coolant being selected so as to be lighter than the mixture if the formed crystals are heavier than the mixture from which they are obtained, said direct thermal exchange being effected by passing the liquid mixture and immiscible liquid coolant alternately through a plurality of stirring zones and quiet zones, the formation of the crystals of the crystallizable component taking place in the stirring zones, by stirring the liquid mixture and immiscible liquid coolant and the partial separation of the crystals taking place in the quiet zones, the liquid mixture being stirred with a new portion of immiscible liquid coolant in each subsequent stirring zone, which is relatively cooler than that of the previous stirring zone so as to form new crystals and recovering the crystals from the immiscible liquid coolant in one stream and said liquid mixture of at least two components which is impoverished of the crystallizable constituent in another stream.

6. The process of claim 5, wherein the crystals are suspended in a residual amount of the impoverished liquid mixture.

7. The process of claim 5, wherein in the quiet zones the crystals are at least partially separated by being directed toward the peripheral portion of said zones from where they pass from zone to zone.

8. The process of claim 5, wherein the crystals have a diameter of about 0.6 to 0.8 mm.

9. The process of claim 6, wherein an interface is established between the immiscible liquid coolant and the suspension of crystals in the impoverished liquid mixture and the suspension of crystals is withdrawn from the immiscible liquid coolant at the level of the interface, thereby avoiding the formation of a mass of crystals which would interfere with the effective recovery of the crystals.

10. The process of claim 9, wherein the residual impoverished liquid mixture is separated from the crystals and reintroduced at said interface at a point opposite from the point where the suspension of the crystals is withdrawn, the flow of the reintroduced mixture sweeping the crystals near the interface into the withdrawal point.

11. A crystallizing apparatus which comprises a chamber, a plurality of alternately arranged stirring blades and bearing plates axially disposed for rotation within said chamber, means for rotating the stirring blades and the bearing plates, said bearing plates having a substantially cone shape and provided with a plurality of apertures in the central portion thereof, the peripheral portion of the bearing plates and the wall of the chamber defining an annular channel extending along the substantial length of said chamber, means for introducing the immiscible cooling liquid and liquid mixture to be crystallized in to the chamber and means for removing the crystals from the chamber.

12. An apparatus according to claim 11, wherein the half-angle at the center of the cone formed by the bearing plates is between 45° and 85°, all of said bearing plates having the same orientation.

13. An apparatus according to claim 11, wherein the half-angle at the center of the cone formed by the bearing plates is between 70° and 85°.

14. The apparatus of claim 11, wherein the chamber is a cylinder provided with an enlarged upper portion.

15. The apparatus of claim 14, wherein the enlarged upper portion is provided with an axially disposed enclosure into which the upper most stirring blade extends, said enclosure defining a central stirring zone, and together with the wall of the chamber an annular quiet zone, said enclosure also containing a dispensing means for the introduction of the immiscible liquid coolant.

16. The apparatus of claim 15, wherein a liquid gas interface is established in the enlarged upper portion of the cylinder, the dispensing means being disposed above the interface and a conduit means extending into the annular quiet zone below the interface for the withdrawal of the impoverished liquid mixture.

17. The apparatus of claim 11, wherein the means for removing the crystals from the chamber is a conduit means which communicates with the lower portion of the chamber at the interface between the immiscible liquid coolant and the crystal suspension and extends in the upward direction.

18. The apparatus of claim 11, wherein the chamber is a substantially vertical elongated enclosure, and the stirring blades and bearing plates are fixed to a rotatable axis.

19. The apparatus of claim 18, wherein the base of the cone-shaped bearing plate is directed toward the bottom of the enclosure.